US012796674B2

(12) United States Patent
Tanner

(10) Patent No.: US 12,796,674 B2
(45) Date of Patent: Nov. 17, 2026

(54) AGRICULTURAL TELESCOPIC UNIT FOR PLANT TREATMENT

(71) Applicant: EcoRobotix SA, Yverdon-les-Bains (CH)

(72) Inventor: Steve Tanner, Essert-Pittet (CH)

(73) Assignee: EcoRobotix SA, Yverdon-les-Bains (CH)

( * ) Notice: Subject to any disclaimer, the term of this patent is extended or adjusted under 35 U.S.C. 154(b) by 170 days.

(21) Appl. No.: 18/908,450

(22) Filed: Oct. 7, 2024

(65) Prior Publication Data

US 2025/0024826 A1 Jan. 23, 2025

Related U.S. Application Data

(63) Continuation-in-part of application No. PCT/IB2024/054724, filed on May 15, 2024.

(30) Foreign Application Priority Data

May 24, 2023 (CH) ................................ 000549/2023

(51) Int. Cl.
*A01M 7/00* (2006.01)

(52) U.S. Cl.
CPC ........ *A01M 7/0071* (2013.01); *A01M 7/0057* (2013.01)

(58) Field of Classification Search
CPC ........................... A01M 7/0071; A01M 7/0057
(Continued)

(56) References Cited

U.S. PATENT DOCUMENTS 2,995,307 A * 8/1961 Mcmahon ........... A01M 7/0053 239/176
3,055,594 A * 9/1962 Nansel ................ A01M 7/0053 239/176

(Continued)

FOREIGN PATENT DOCUMENTS

CN 103181257 A 7/2013
EP 0118366 A1 6/1987

(Continued)

*Primary Examiner* — Chee-Chong Lee
(74) *Attorney, Agent, or Firm* — BLANK ROME LLP

(57) ABSTRACT

The present invention relates to an agricultural telescopic unit (10) for treating an area of a cultivated field (400), comprising a telescopic structure (20) adapted to be actuated between a retracted configuration and a deployed configuration. The telescopic structure (20) comprises at least a proximal case (100) and a distal nestable case (300). The distal nestable case (300) is slidably connected to the proximal case (100) to move into or outside the proximal case (100) when the telescopic structure (20) is respectively moved in the retracted and deployed configuration. The proximal case (100) and the distal nestable case (300) each comprises each a top wall (102, 302) arranged to be in a plane substantially parallel to the cultivated field (400) when the agricultural telescopic unit (10) is operating with the telescopic structure (20) in the deployed configuration, and two opposite side walls (104, 106, 304, 306). The distal case (100, 300) further comprises an extremity wall (308) extending between the two opposite side walls (304, 306) to form an enclosure with an open side facing the cultivated field (400) when the telescopic structure (20) is in the deployed configuration. The agricultural telescopic unit (10) further comprises a vision system (30) and a plant treatment device (40) mounted inside each of the proximal case (100) and the distal nestable case (300).

18 Claims, 14 Drawing Sheets

(58) Field of Classification Search
USPC .......................................................... 239/165
See application file for complete search history.

(56) References Cited

U.S. PATENT DOCUMENTS

| | | | | | |
|---|---|---|---|---|---|
| 3,074,649 | A * | 1/1963 | Atkinson | H02G 1/02 239/176 |
| 3,514,038 | A * | 5/1970 | Mcquinn | A01M 7/0071 239/168 |
| 4,344,572 | A * | 8/1982 | Tyler | A01M 7/0075 239/168 |
| 4,784,324 | A * | 11/1988 | DeWitt | A01M 7/0053 52/118 |
| 5,348,226 | A * | 9/1994 | Heiniger | A01M 7/0057 239/164 |
| 5,375,767 | A * | 12/1994 | Thorstensson | A01M 7/0053 239/164 |
| 5,507,435 | A * | 4/1996 | Benest | A01M 7/0057 239/167 |
| 6,234,407 | B1 * | 5/2001 | Knight | A01M 7/0053 239/166 |
| 6,315,218 | B1 * | 11/2001 | Guesdon | A01M 7/0053 239/164 |
| 6,491,234 | B2 * | 12/2002 | Beggs | A01M 7/0075 239/166 |
| 2021/0283642 | A1 * | 9/2021 | Smith | A01M 7/005 |

FOREIGN PATENT DOCUMENTS

| | | | |
|---|---|---|---|
| EP | 1468604 | B1 | 2/2009 |
| WO | 2009046723 | A1 | 4/2009 |

* cited by examiner

AGRICULTURAL TELESCOPIC UNIT FOR PLANT TREATMENT

CROSS-REFERENCE TO THE RELATED APPLICATIONS

This application is a continuation-in-part of International Patent Application No. PCT/IB2024/054724, filed May 15, 2024 which claims the benefit of priority of Swiss Patent Application No. CH000549/2023, filed May 24, 2023, the entire content of which is relied upon and incorporated herein by reference in its entirety.

FIELD OF THE INVENTION

The present invention concerns the field of agriculture plant treatment and more particularly to an agricultural telescopic unit for plant treatment. The invention also concerns a spraying machine comprising two agricultural telescopic units arranged such that their respective deployable directions are opposite.

DESCRIPTION OF RELATED ART

Recent advances in agricultural spraying systems include so-called smart sprayers, using cameras and artificial vision to detect targets ahead of the spray bar, for instance weeds, and electrically controlled nozzles mounted on the spray bar that are opened when the targets to spray pass under the bar. The resulting spraying operation is called spot spray, in opposition to full or broad or blanket spray operation, the spot spray being applied only on the targets to be sprayed.

In such systems, there is a need to get the highest possible spray precision with the smallest possible spot spray size with their position controlled with the utmost precision. This allows for instance to spray very small weeds with the minimal amount of liquid, or to spray a weed located very close to a crop plant without spraying it.

Small spot spray is achieved by a small spray divergent angle, and a small distance from nozzle to the target. The spray bar must therefore be positioned at a low height from ground.

High precision spot spray positioning depends on precise 3D position estimation (mapping) of the target to be sprayed, in the 3D coordinate system of the spray bar, and precise 3D tracking of the position of the target to be sprayed, from the time of the camera acquisition to the time of the spray application. Accurate target mapping is obtained by a combination of high quality image acquisition by the camera, short camera exposure time to avoid movement blur, high pixel resolution and camera intrinsic calibration to compensate for errors between pixel and image place coordinates, and camera extrinsic calibration to accurately measure the camera position in the machine coordinate system.

Precise lateral spray positioning requires high spatial resolution nozzle array using high density of individually controlled nozzles by unit of spray bar width.

Finally, precise spot spray requires accurate detection and classification of the objects in the scene to distinguish between a target to be sprayed and a target not to be sprayed. The recognition of the kind of target to be sprayed, for instance the classification of the plants on the ground into several classes of weeds or crops, is performed by image processing and visual object recognition and classification techniques. For such techniques to be robust and to perform with the highest correct detection score, the illumination of the scene must be as constant and as homogeneous as possible to prevent as much as possible the image variability caused by shades and colour variation. A way to strongly facilitate object recognition is to protect the observed area from the ambient sunlight by means of a cover extending down to the ground around the observed camera area, and to provide artificial illumination with constant colours. A cover extending down to ground is important to block direct sunlight when the sun is low on the horizon.

In such a high precision spraying system, there is also a need to reduce the droplet drift as much as possible, usually caused by the wind, but also by the movement of the air volume displaced by the movement of the machine since droplet drift causes transport of the chemical agent up to unwanted targets (neighbour field, protected watershed areas, rivers, etc.). Anti-drift techniques have been developed to limit as much as possible the droplet drift during agricultural spraying operations, whether with spot spray or with full spray application. Sprayer equipment with drift reduction allows to work closer to field boundaries, thus reducing the unprocessed field area.

There are several techniques to reduce droplet drift. The most common is to use nozzles producing bigger droplets, less prone to wind transportation. Another technique uses a vertical air flow, generated from above the nozzles and directed towards ground, which reduces the influence of external wind on the droplet transport. A third technique consists of protecting the nozzle jet from wind using a cover surrounding the jet area and extending down to ground.

A structure covering both the camera field of view and the spray bar, and extending down to ground, addresses therefore to the double need of controlled illumination of the scene and low drift operation of the spray bar. Such a structure has unfortunately a large volume, as it must extend above the camera, and must extend near the ground beyond the camera field of view on the forward and lateral directions, and beyond the spray jets on the rear direction.

To build an agricultural spraying equipment having such a cover structure may be simple for small machine widths but becomes very challenging for larger machines that must be folded for road transportation. Equipping a smart sprayer of ten meters wide or more with a cover, and still having a foldable machine is a very complex design work.

BRIEF SUMMARY OF THE INVENTION

An aim of the invention is therefore to propose an agricultural spraying unit that is exempt, or at least mitigate, the above-mentioned drawbacks.

In particular, an aim of the present invention to propose a spraying unit for high precision spot spraying and which is easy to be folded for road transportation.

This aim is achieved by an agricultural telescopic unit for treating an area of a cultivated field, comprising a telescopic structure adapted to be actuated between a retracted configuration and a deployed configuration. The telescopic structure comprises a proximal case, a distal nestable case and preferably at least one intermediate nestable case therebetween. The distal nestable case is slidably connected to the proximal case by a guiding system to move into or outside the proximal case when the telescopic structure is respectively moved in the retracted and deployed configuration. The proximal case, the distal nestable case and preferably the at least one intermediate nestable case comprise each a top wall arranged to be in a plane substantially parallel to the cultivated field when the agricultural telescopic unit is operating with the telescopic structure in the deployed configuration, and two opposite side walls. The distal case further comprises an extremity wall extending between the two opposite side walls to form an enclosure with an open side facing the cultivated field when the telescopic structure is in the deployed configuration. The agricultural telescopic unit further comprises a vision system and a plant treatment device mounted inside each of the proximal case, the distal nestable case and preferably of the intermediate nestable case.

In an embodiment, the proximal case further comprises a first and a second equipment supports extending along the deployment direction of the telescopic structure and comprising each a rail. The distal nestable comprises at least a first and a second slider. Optionally, the intermediate nestable case further comprises a first and a second equipment support extending along said deployment direction. The first and second equipment supports of the intermediate nestable case comprise each a rail. The first and second sliders of the distal nestable case are slidably engaged with either respective rails of the first and second equipment supports of the proximal case, or respective rails of the first and second equipment supports of the intermediate nestable case.

In an embodiment, the intermediate nestable case further comprises a first and a second intermediate support extending along said deployment direction. The first and second intermediate supports comprise each a slider and a rail. The distal case further comprises a third and a fourth slider slidably engaged with respective rail of respective first and second intermediate supports. The slider of said first and second intermediate supports are slidably engaged with respective rails of the first and second equipment supports of the proximal case.

In an embodiment, the vision system and the plant treatment device of the proximal case are mounted respectively on the first and second equipment supports of the proximal case. The vision system and the plant treatment device of the intermediate nestable case are mounted respectively on the first and second equipment supports of the intermediate nestable case. The vision system and the plant treatment device of the distal nestable case are mounted against a bottom side of the top wall of the distal nestable case.

In an embodiment, an extremity of each of the first and second equipment supports of the intermediate case is fixed to the intermediate case top wall by an extremity fixture on the proximal case side.

In an embodiment, an extremity of each of the first and second equipment intermediate supports of the intermediate case is fixed to the intermediate case top wall by an extremity fixture on the proximal case side.

In an embodiment, the vision system of each of at least said proximal case, and distal nestable case and preferably of the intermediate nestable case therebetween are mounted in a same plane substantially parallel to the cultivated field when the agricultural telescopic unit is operating with the telescopic structure in the deployed configuration parallel to the cultivated field.

In an embodiment, the plant treatment device of each of at least said proximal case and distal nestable case and preferably of the intermediate nestable case therebetween is a spray bar comprising a plurality of nozzles.

In an embodiment, the plant treatment device of each of at least the proximal case and distal nestable case and preferably of the intermediate nestable case therebetween, are mounted such that the distal end of each plant treatment device, for instance the nozzles of a spray bar, of each of said proximal case, distal nestable case and preferably the intermediate nestable case are located in a same plane substantially parallel to the cultivated field when the agricultural telescopic unit is operating with the telescopic structure in the deployed configuration parallel to the cultivated field.

In an embodiment, the agricultural telescopic unit further comprises at least one actuator connected to both the proximal case and the distal nestable case to actuate the telescopic structure between the retracted configuration and the deployed configuration.

In an embodiment, the agricultural telescopic unit further comprises a first and a second telescopic actuator comprising each an outer cylinder with an open end and a telescopic element coaxially mounted within the outer cylinder for sliding movement relative to the cylinder. The outer cylinder of the first actuator has one extremity fixed to the proximal case. A distal extremity of the telescopic element of the first actuator is fixed to the outer cylinder of the second actuator. The outer cylinder of the second telescopic actuator is fixed to the top wall of the intermediate nestable case by an extremity fixture on the proximal case side. A distal extremity of the telescopic element of the second actuator is fixed to the extremity wall of the distal nested case. The first and second telescopic actuators can thus actuate the telescopic structure between the retracted configuration and the deployed configuration. More particularly, the first actuator is arranged to move the intermediate nestable case in relation to the proximal case while the second actuator is arranged to move the distal nestable case in relation to the intermediate nestable case.

Another aspect of the invention relates to a mountable or semi-mountable spraying machine for an agricultural tractor, comprising a supporting frame attachable to the agriculture tractor in mountable or in a semi-mountable manner by means of a three-point hitch system, and two agricultural telescopic units according to any of the above-described embodiments. These two telescopic units are fixed to the supporting frame such that their respective deployable directions are opposite.

In an embodiment, each agricultural telescopic unit is pivotably mounted on the supporting frame to be brought in an upright position for transportation.

Another aspect of the invention relates to a trailable spraying machine for an agricultural tractor, comprising a supporting frame attachable to the tractor by a drawbar, two wheels attached to a rear side of the supporting frame, a fluidic system with tank and pressure pump mounted on the supporting frame and two agricultural telescopic units according to any of the above-described embodiments. Each agricultural telescopic unit is pivotally mounted on the supporting frame by means of a longitudinal rotation axis to be pivoted in an upright position for transportation.

In an embodiment, the agricultural telescopic unit further comprises at least one wheel attached to a rear side of the agriculture telescopic units with respect to the travelling direction of the machine. The at least one wheel is in contact with the ground during operation so as to provide a constant distance between the agricultural telescopic units and the cultivated field. The vertical position of the at least one wheel, when in contact with the ground, is adjustable either manually or through an automatic height control system so as to provide an adjustable distance between the agricultural telescopic units and the cultivated field.

BRIEF DESCRIPTION OF THE DRAWINGS

The invention will be better understood with the aid of the description of embodiment given by way of examples and illustrated by the figures, in which.

DETAILED DESCRIPTION OF POSSIBLE EMBODIMENT OF THE INVENTION

Figure 1:
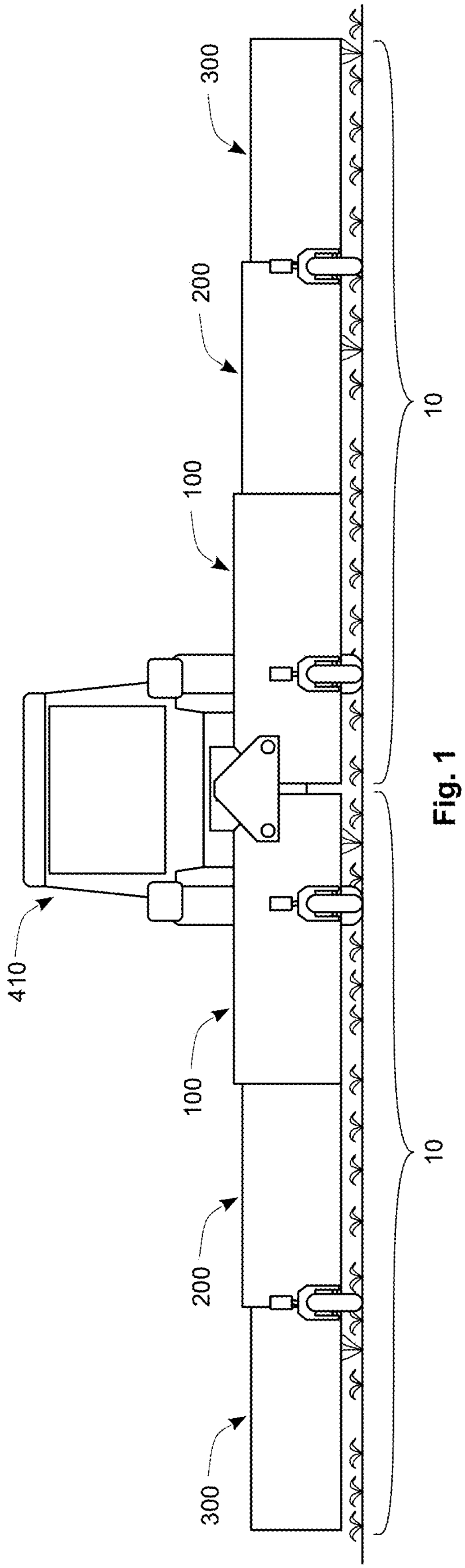
FIG. 1 shows a schematic rear view of a spraying machine operationally connected an agricultural tractor, the spraying machine comprising two agricultural telescopic spraying units in a deployed configuration according to an embodiment.
Figure 2:
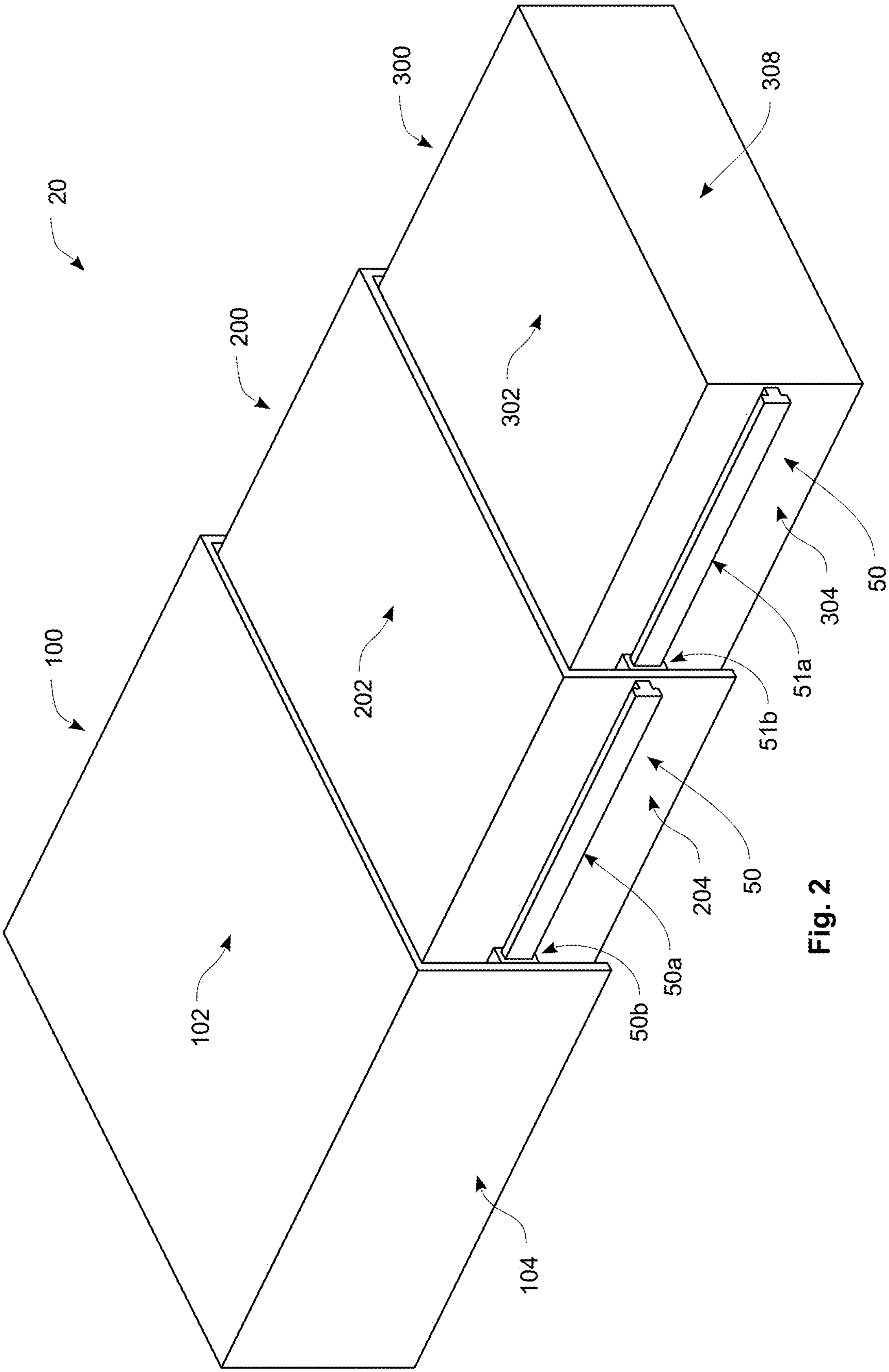
FIG. 2 shows a schematic perspective view of one of the two agricultural telescopic spraying units of FIG. 1 shown in the deployed configuration with proximal, intermediate and distal cases.

According to an embodiment, a spraying machine is operationally connected to an agricultural tractor 410 is illustrated in FIG. 1. The spraying machine comprises two agricultural telescopic units 10. With reference to FIG. 2, each telescopic unit 10 comprises a telescopic structure 20 having a proximal case 100, an intermediate nestable case 200 and a distal nestable case 300 which are slidably connected together by a guiding system 50 to bring each telescopic unit from a retracted configuration to a deployed configuration and vice versa.

Figure 3:
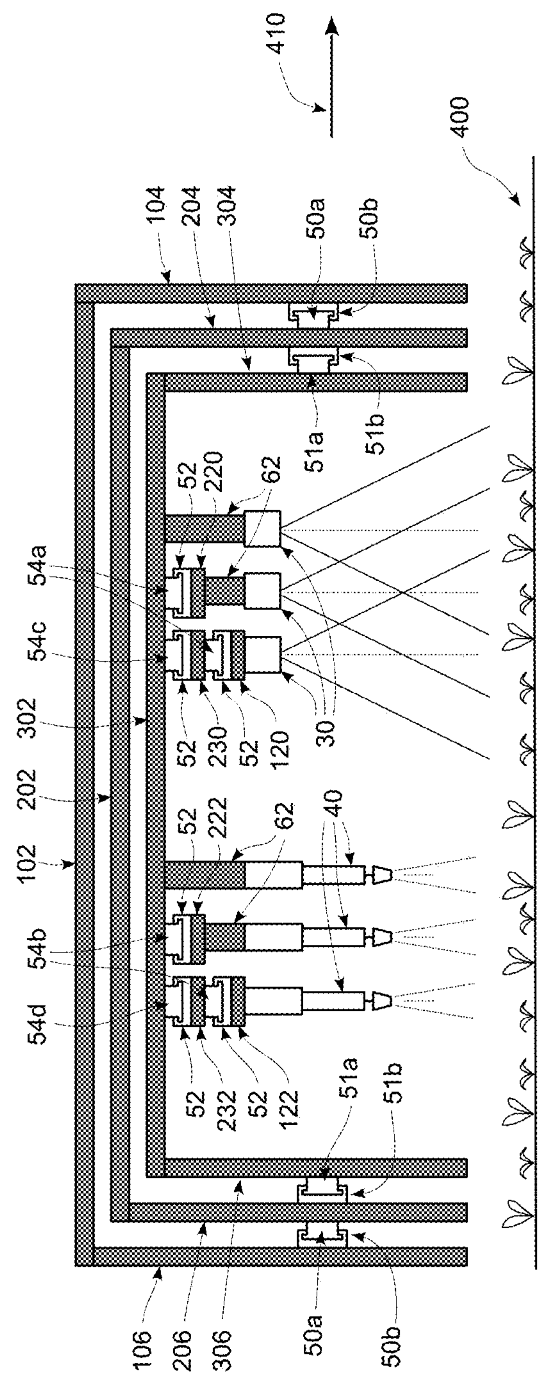
FIG. 3 shows a schematic cross-sectional view of the telescopic spraying unit of FIG. 2 in a transverse direction perpendicular to its deployment direction.

More particularly, with reference to FIGS. 2 and 3, the distal nestable case 300 is slidably mounted to be nested inside the intermediate nestable case 200 which is slidably mounted to be nested inside the proximal case 100. To this end, the proximal case 100 comprises two opposite side walls 104, 106, a top wall 102 extending between an upper edge of the opposite walls 104, 106 and an optional extremity wall 108 (FIGS. 4*a* to 4*c*) extending between a lateral edge of the opposite walls. The intermediate nestable case 200 comprises two opposite side walls 204, 206 and a top wall 202 extending between an upper edge of the opposite walls 204, 206. The distal nestable case 300 comprises two opposite side walls 304, 306, a top wall 302 extending between an upper edge of the opposite walls 304, 306 and an extremity wall 308 (FIGS. 4*a* to 4*c*) extending between a lateral edge of the opposite walls. The extremity wall 108, 308 of both proximal and distal cases 100, 300 are arranged opposite to each other to form an enclosure with only one open side facing the cultivated field 400 when the telescopic structure 20 is in the deployed configuration.

The extremity wall 108 of the proximal case is optional due to the fact that the agricultural telescopic unit 10 is generally mounted on an agricultural machine having a second telescopic unit 10, both units being mounted against each other such that their respective lateral deployable directions are opposite. Since the extremity walls 108 of the two units are touching each other, and are located inside a volume already closed laterally by the side walls and extremity walls 308 of both telescopic units 10, they have no longer any usage. Their presence is nevertheless required if only one agricultural telescopic unit 10 is mounted on an agricultural machine. In this case, the extremity wall 108 must be present to close the volume under the unit.

In the embodiment shown in particular by FIGS. 2 and 3, the guiding system 50 comprises a slider 50*a* arranged on both opposite sides 204, 206 of the intermediate nestable case 200 and extending along the deployment direction of the telescopic structure 20. These sliders 50*a* are slidably engaged with respective rails 50*b* arranged on the inner side of both opposite walls 104, 106 of the proximal case 102. The guiding system 50 further comprises a slider 51*a* arranged on both opposite sides 304, 306 of the distal nestable case 300 and extending along the deployment direction of the telescopic structure 20. These sliders 51*a* are slidably engaged with respective rails 51*b* arranged on the inner side of both opposite walls 204, 206 of the intermediate nestable case 102.

Figure 4A:
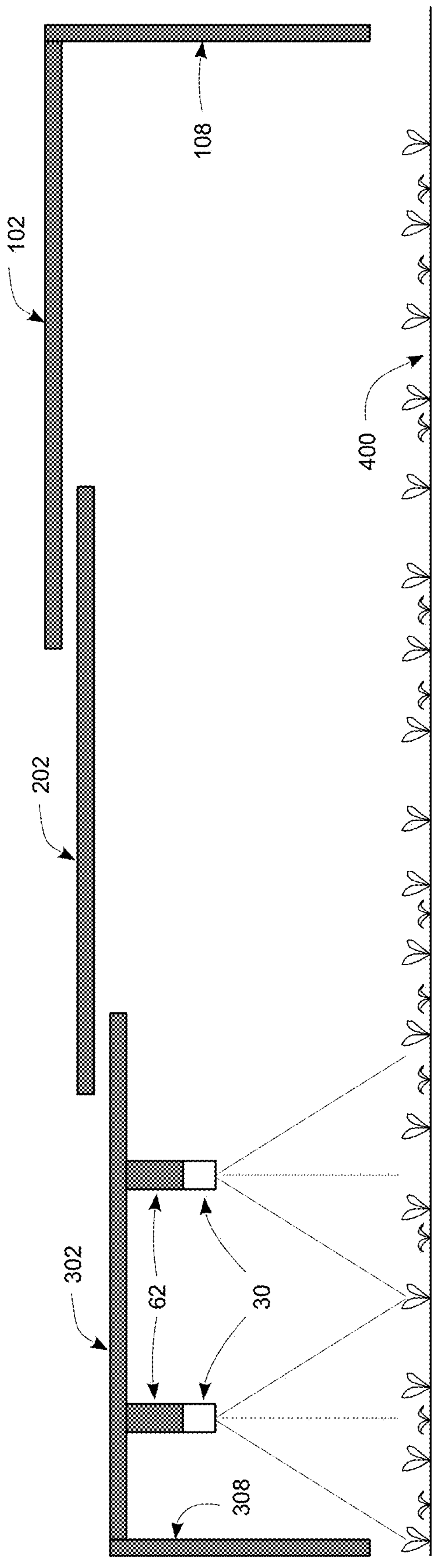
FIG. 4*a* shows a simplified schematic cross-sectional view of the telescopic spraying unit of FIG. 2 in a transverse direction along its deployment direction, whereby the vision system of the distal case is shown.
Figure 4B:
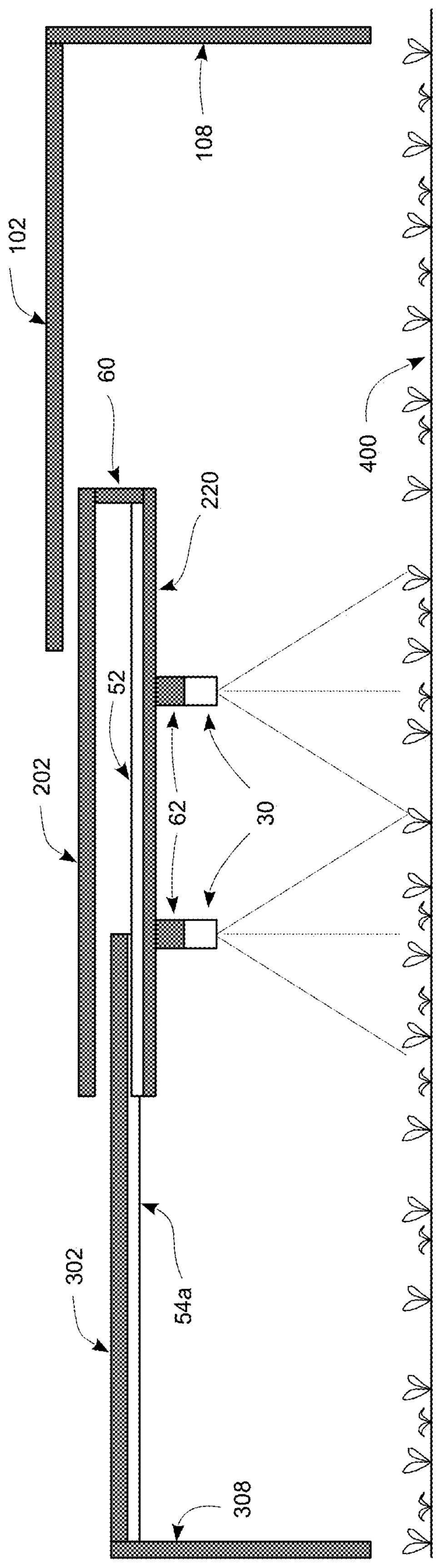
FIG. 4*b* shows a similar view of FIG. 4*a*, whereby the vision system of the intermediate case is shown.
Figure 4C:
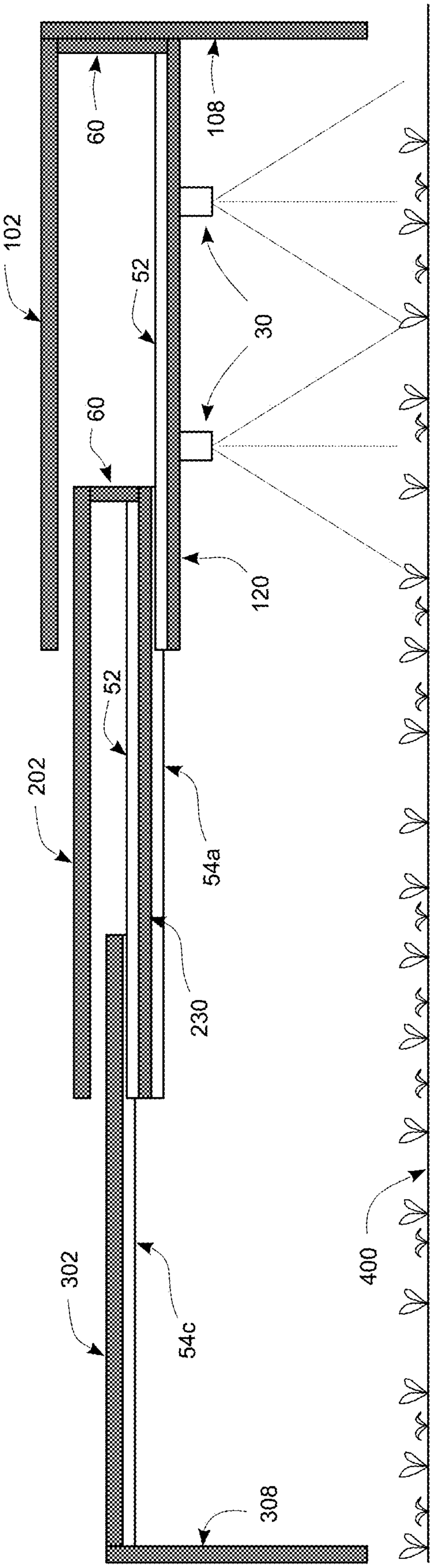
FIG. 4*c* shows a similar view of FIG. 4*a*, whereby the vision system of the proximal case is shown.
Figure 4D:
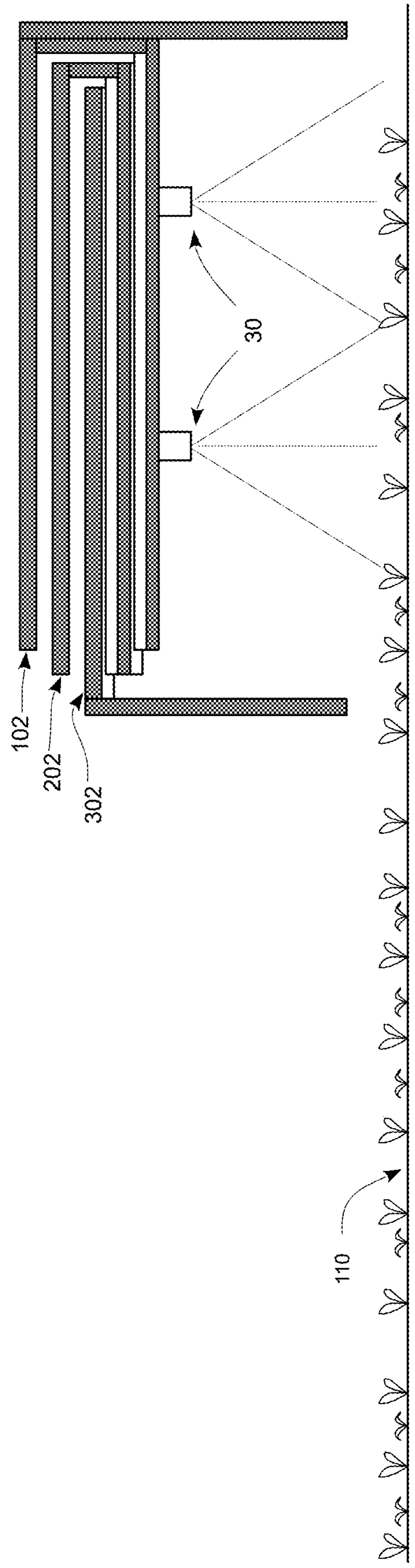
FIG. 4*d* shows a simplified schematic cross-sectional view of the telescopic spraying unit of FIG. 2 in a retracted configuration.
Figure 5:
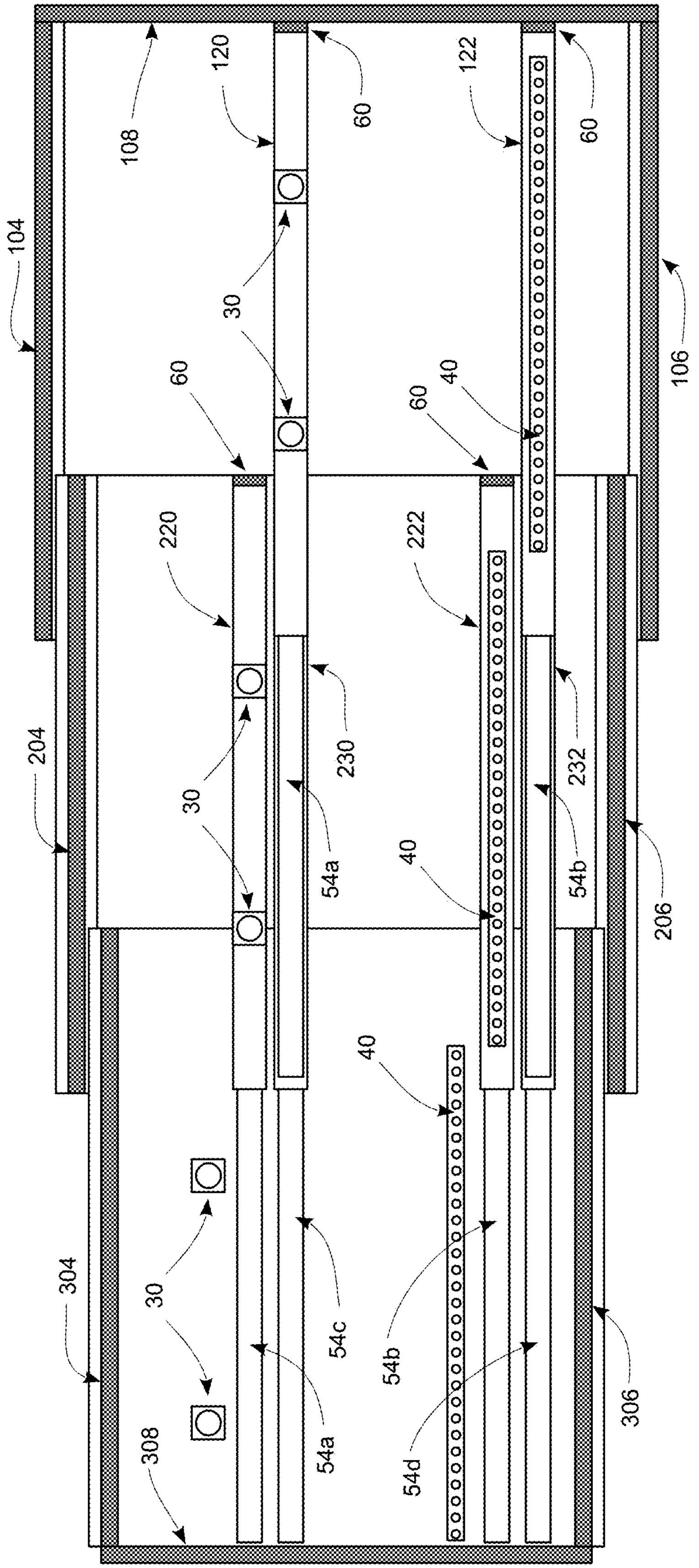
FIG. 5 shows a simplified bottom view of the agricultural telescopic spraying unit of FIG. 2 with the vision system and the plant treatment device of each proximal, intermediate and distal cases.

Referring to FIGS. 3 to 5, the bottom side of the proximal case top wall 102 comprises a first and a second equipment support 120, 122 for example in the form of bars extending in the deployment direction of the telescopic structure 20. An extremity of each equipment support 120, 122 is fixed to the top wall 102 of the proximal case 100 via an extremity fixture 60 as shown in FIGS. 4*c* and 5. A rail 52 is mounted on a longitudinal side of each equipment support 120, 122. In the non-illustrated embodiment, wherein the proximal case does not comprise any extremity wall as described above, the above extremity of each equipment support may be fixed for example to the top wall inner side of the proximal case.

The intermediate nestable case 200 comprises a first and a second equipment support 220, 222 for example in the form of bars extending in the deployment direction of the telescopic structure 20. An extremity of each equipment support 220, 222 is fixed to the intermediate nestable case top wall 202 by an extremity fixture 60 as shown in FIGS. 4*b* and 5. The intermediate nestable case 200 further comprises a first and a second intermediate support 230, 232 extending alongside respective first and second equipment supports 220, 222 and fixed to the intermediate nestable case top wall 202 by another extremity fixture 60 as shown in FIG. 4*c*. A first and a second slider 54*a*, 54*b* (FIG. 5) are fixed to respective first and second intermediate supports 230, 232 and are slidably engaged with respective rails 52 of the first and second equipment supports 220, 222 of the proximal case 100.

With reference to FIG. 5, a first and a second slider 54*a*, 54*b* are mounted on the bottom side of the distal case top wall 302 and are slidably engaged with a rail 52 mounted on the first and second equipment support 220, 222 of the intermediate nestable case as shown in FIG. 4*b* (only the first slider 54*a* is visible). A third and a fourth sliders 54*c*, 54*d* are mounted on the bottom side of the distal case top wall 302 and are slidably engaged with a rail 52 connected to respective first and a second intermediate support 230, 232 as shown in FIG. 4*c* (only the third sider 54*c* is visible).

A vision system 30 is mounted on the first equipment support 120, 220 and a plant treatment device 40 is mounted on the second equipment support 122, 222 of respective proximal and intermediate cases 100, 200 while a vision system 30 and a plant treatment device 40 is mounted on the bottom side of the distal case top 302. The vision system 30 may for example comprise one or more camera aligned with the deployment direction of the telescopic structure 20. The plant treatment device 40 may comprise for example a spray bar with a plurality of nozzles also aligned with the deployment direction of the telescopic structure.

Figure 8:
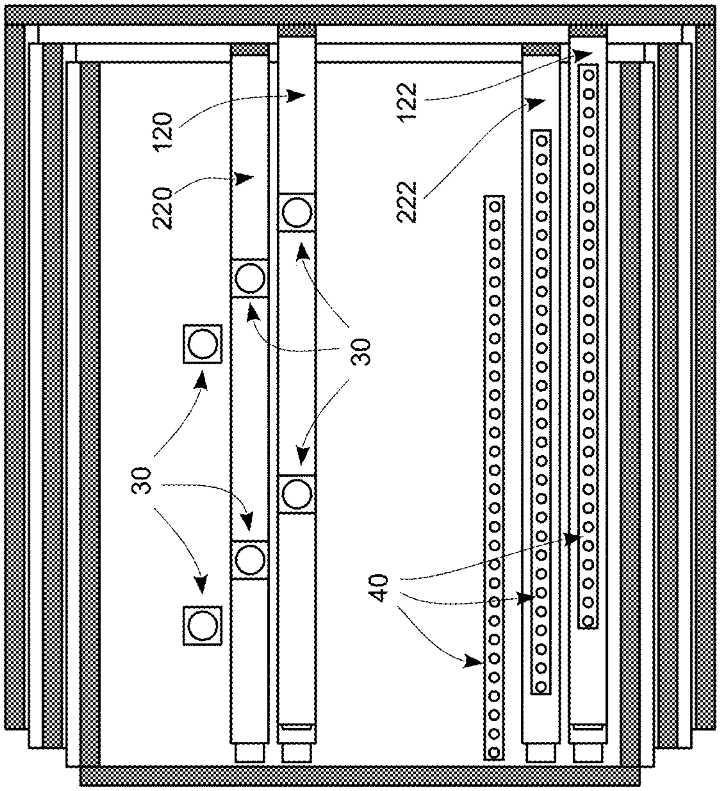
FIG. 8 shows the proximal, intermediate and distal cases of the agricultural spraying unit of FIG. 5 in the retracted configuration.

The first and second equipment support 120, 122, 220, 222 of the proximal case and intermediate cases 100, 200 and the vision system 30 and the plant treatment device 40 of the distal case 30 have been positioned to extend parallelly to each other such that the agricultural telescopic unit can be brought in the retracted configuration as shown in FIGS. 4*d* and 8.

Referring to FIG. 3, the vision system 30 of the proximal and intermediate cases are mounted on a spacer 62 such that the vision system 30 of respective proximal, intermediate and distal cases are mounted in a same plane substantially parallel to the cultivated field 400 when the agricultural telescopic unit is operating with the telescopic structure in the deployed configuration parallel to the cultivated field 400 as illustrated by FIGS. 4*a*, 4*b* and 4*c*. Similarly, the plant treatment device 40 of the proximal and intermediate cases are mounted on a spacer 62 such that the plant treatment device of respective proximal, intermediate and distal cases are mounted in a same plane substantially parallel to the cultivated field 400 when the agricultural telescopic unit is operating with the telescopic structure in the deployed configuration parallel to the cultivated field.

Figure 6:
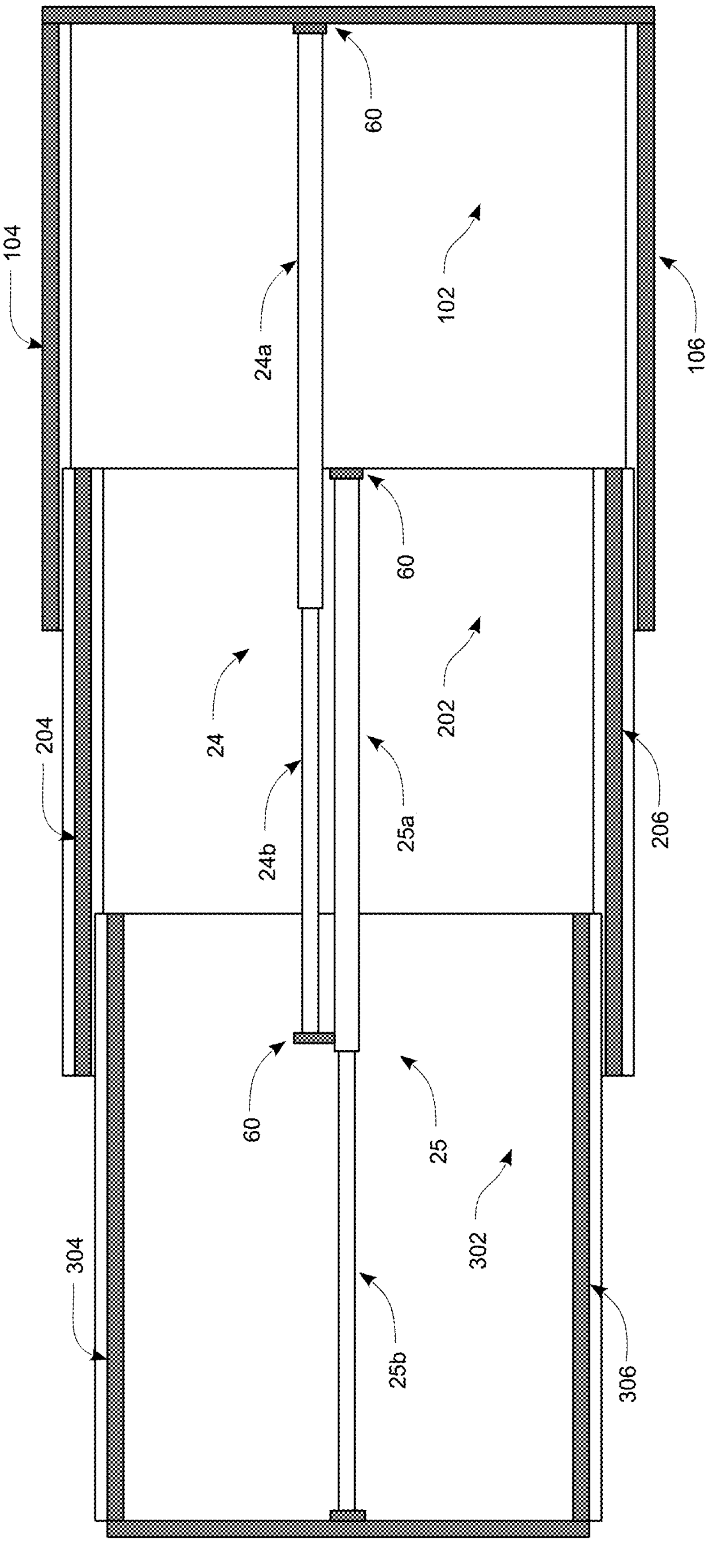
FIG. 6 shows a simplified bottom view of the agricultural telescopic spraying unit of FIG. 2 with the first and second telescopic actuators arranged to move the telescopic spraying unit from the retracted to the deployed configuration and vice versa.

With reference to FIG. 6, the telescopic structure comprises a first and a second actuator 24, 25, for example a first and a second telescopic jack. The first and second telescopic jack 24, 25 comprise each an outer cylinder 24*a*, 25*a* with an open end and a closed end and at least one telescoping tubular element 24*b*, 25*b* coaxially mounted within the outer cylinder 24*a*, 25*a* for sliding movement relative to the cylinder. The closed end of the first telescopic jack cylinder 24*a* is fixed to the proximal case extremity wall 108 while a distal end of the first telescopic jack tubular element 24*b* is connected to the second telescopic jack cylinder 25*a* by an extremity fixture 60. The closed end of the second telescopic jack cylinder 25*a* is fixed to the intermediate case top wall 202 by an extremity fixture 60 while the distal end of the second telescopic jack tubular element 25*b* is connected to the distal case extremity wall 308. In the non-illustrated embodiment, wherein the proximal case does not comprise any extremity wall as described above, the closed end of the first telescopic jack cylinder may be fixed for example to the top wall 102 inner side of the proximal case by an extremity fixture 60.

Figure 7:
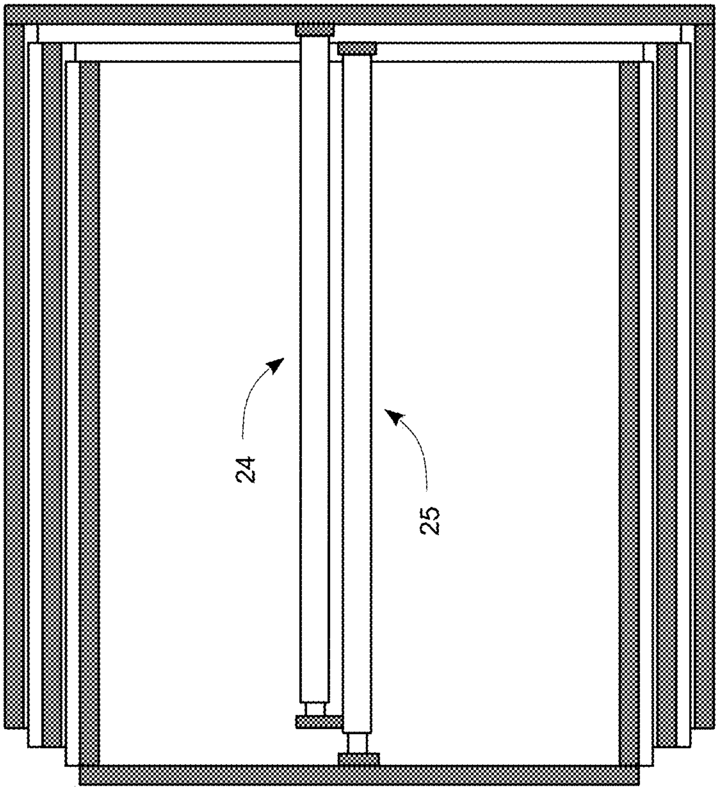
FIG. 7 shows the proximal, intermediate and distal cases of the agricultural spraying unit of FIG. 6 in the retracted configuration.

The first telescopic jack 24 is therefore arranged to move the intermediate case 200 relative to the proximal case 100 whereas the second telescopic jack 24 is arranged to move the distal case relative to the intermediate case 200 to bring the agricultural telescopic structure from a retracted configuration to a deployed configuration as illustrated by FIGS. 6 and 7.

Figure 9:
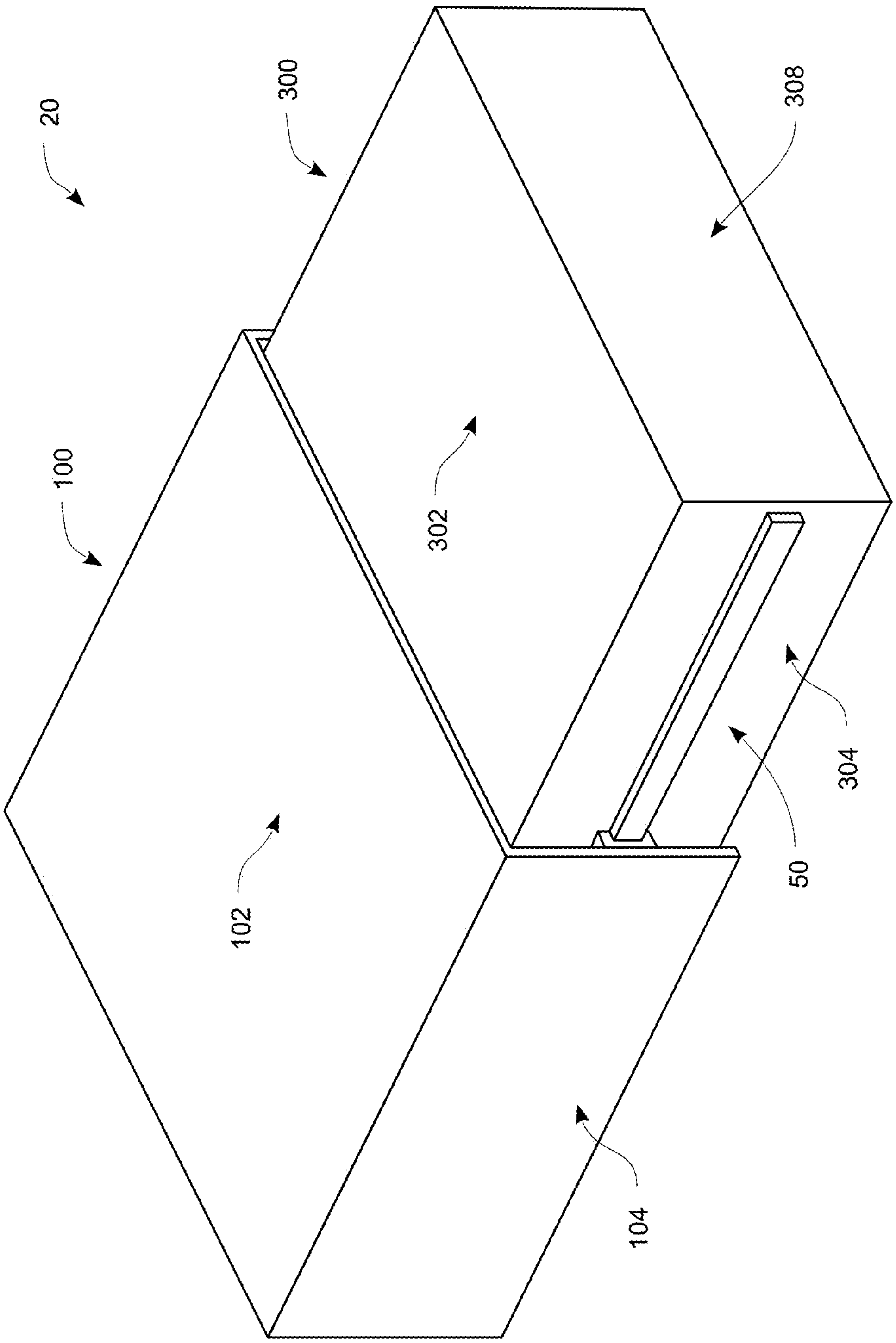
FIG. 9 shows a schematic perspective view of an agricultural telescopic spraying unit in the deployed configuration, according to another embodiment.
Figure 10:
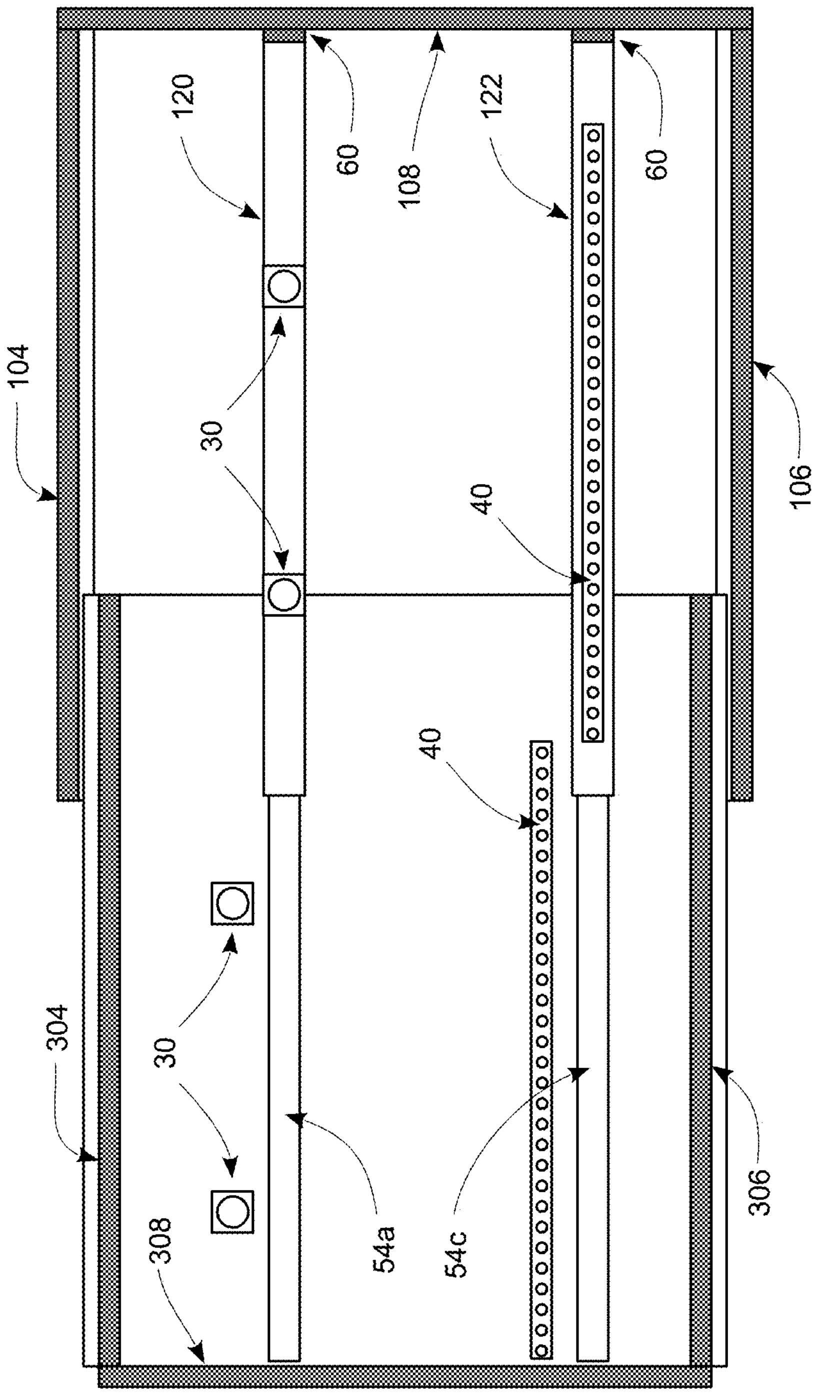
FIG. 10 shows a simplified bottom view of the agricultural telescopic spraying unit of FIG. 9 with the vision system and the plant treatment device of the proximal and distal cases.
Figure 11:
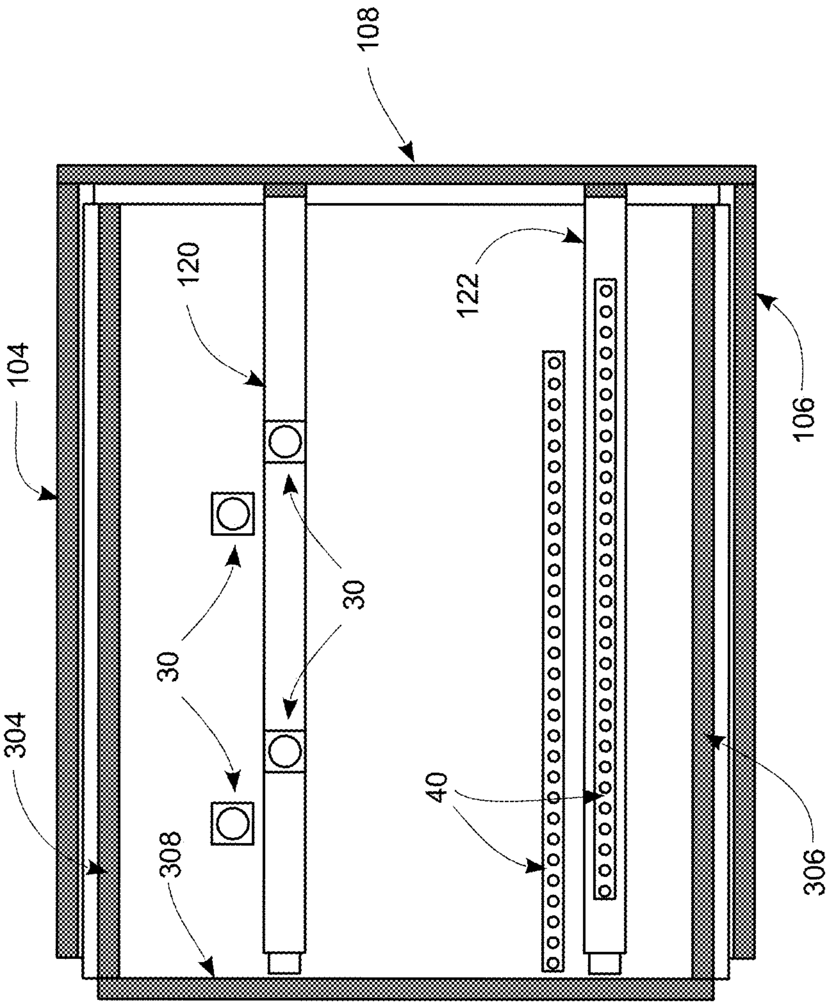
FIG. 11 shows the proximal and distal cases of the agricultural spraying unit of FIG. 9 in the retracted configuration.
Figure 13:
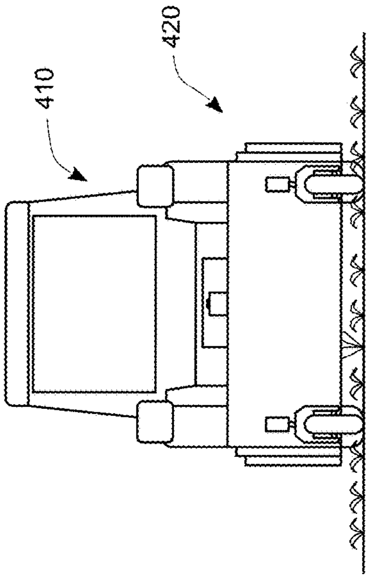
FIG. 13 shows a rear view of the spraying machine and the agricultural tractor of FIG. 12.

In another embodiment illustrated by FIGS. 9 to 11, the telescopic structure 20 may comprise only a proximal case 100 and a distal case 300 slidably connected to the proximal case 100 by a guiding system 50 as described with respect to the embodiment of FIGS. 2 to 8. As for the telescopic structure with three cases, the proximal case 100 comprises two opposite side walls 104, 106, a top wall 102 extending between an upper edge of the opposite walls 104, 106 and an optional extremity wall 108 extending between a lateral edge of the opposite walls. The distal case 300 comprises two opposite side walls 304, 306, a top wall 302 extending between an upper edge of the opposite walls 304, 306 and an extremity wall 308 extending between a lateral edge of the opposite walls. The extremity wall 108, 308 of both proximal and distal cases 100, 300 are arranged opposite to each other to form an enclosure with only one open side facing the cultivated field when the telescopic structure 20 is in the deployed configuration.

As for the embodiment with the proximal intermediate and distal case, the agricultural telescopic unit may comprise a proximal case with only two opposite walls and a top wall extending between an upper edge of the opposite walls while the disable nestable case has the same configuration as the one described above to form an open side facing the cultivated field when the telescopic structure is in the deployed configuration.

In a preferred embodiment, the opposite side walls 104, 106, 304, 306 of proximal and distal cases 100, 300 and possibly the opposite side walls 204, 206 of the intermediate case 200 extend as near as possible to the ground when the spraying machine is operating. In function of the height of the plants present on the field, the gap between the ground and the bottom of the opposite walls must sometimes be kept sufficient to allow the cover operating above the cultivated field without touching and damaging the crop plants. The gap may vary for example from 2 to 80 cm, preferably from 2 to 30 cm and even more preferably from 2 to 10 cm.

The lower part of the opposite walls 104, 106, 204, 206, 304, 306 can be made of a flexible structure to fill this gap, for instance a tarpaulin, or strips of tarpaulin, so that this flexible structure will bend when in contact with the crop plants without damaging them. The height of the lateral opposite side walls, whether rigid or flexible, can be made adjustable to adapt to various crop plant heights. The extremity wall 308 of the distal case 300 may also extend as near as possible to the ground when the spraying machine is operating leaving a gap which may vary for example from 2 to 80 cm, preferably from 2 to 30 cm and even more preferably from 2 to 10 cm. The lower part of the extremity wall 308 may also can be made of a flexible structure, for instance a tarpaulin, or strips of tarpaulin to fill the gap.

With reference to FIGS. 10 and 11, the bottom side of the proximal case top wall 102 comprises a first and a second equipment support 120, 122 for example in the form of bars extending in the deployment direction of the telescopic structure. An extremity of each equipment support 120, 122 is fixed to the extremity wall 108 of the proximal case 100. A rail (not shown) is mounted on a longitudinal side of each equipment support 120, 122. A first and a second slider 54*a*, 54*b* are mounted on the bottom side of the distal case top wall 302 and are slidably engaged with respective rails of the proximal case. In the non-illustrated embodiment, wherein the proximal case does not comprise any extremity wall as described above, the above extremity of each equipment support may be fixed for example to the top wall 102 inner side of the proximal case by an extremity fixture 60.

The first and second equipment support 120, 122 of the proximal case and intermediate cases 100, 200 and the vision system 30 and the plant treatment device 40 of the distal case 30 have been positioned to extend parallelly to each other such that the agricultural telescopic unit can be brought in the retracted configuration as shown in FIGS. 4*d* and 8.

With reference to FIGS. 12 to 15, an aspect of the invention relates to a spraying machine 420 rigidly attachable to the tractor 410 by a three-point hitch system 426 such that the spraying machine 420 is kept raised above the ground during transport and that has one or more wheels 424 to possibly support part of its weight when the spraying machine is operating in a field.

Figure 15:
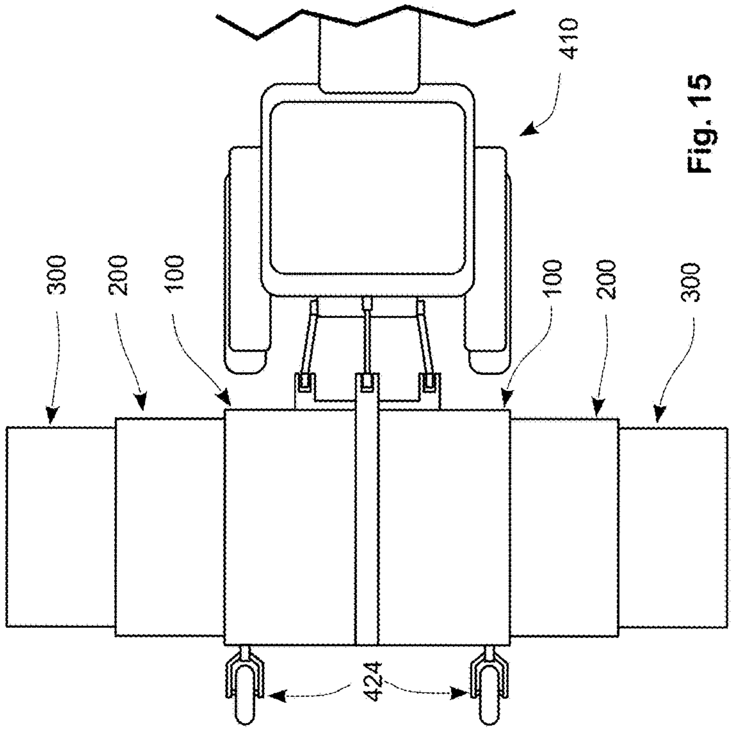
FIG. 15 shows a similar view of FIG. 14 with the two agricultural telescopic spraying units of the spraying machine in the deployed configuration.
Figure 12:
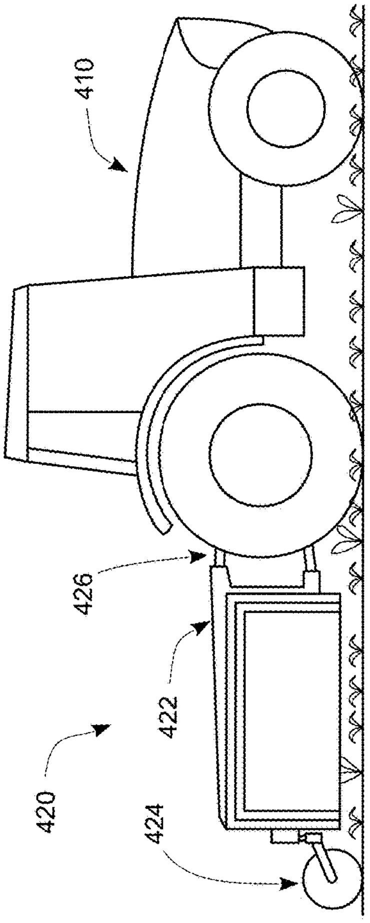
FIG. 12 shows a side view of a spraying machine connected to an agricultural tractor according to another aspect, wherein the spraying machine comprises two agricultural telescopic spraying units in the retracted configuration.
Figure 14:
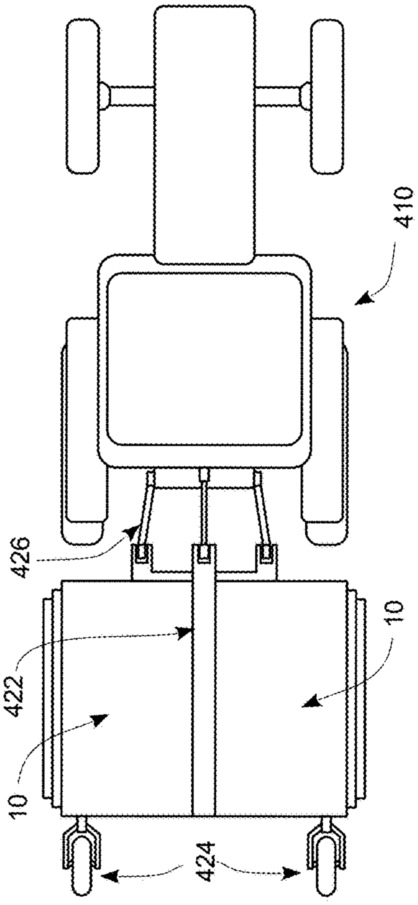
FIG. 14 shows a top view of the spraying machine and the agricultural tractor of FIG. 12.

The spraying machine 420 comprises two agricultural telescopic units 10 as described with reference to FIGS. 1 to 8. These two telescopic units 10 are fixed to the supporting frame 422 such that the optional extremity wall 108 (FIG. 5) of the proximal case 100 of respective agricultural telescopic units 10 are mounted against each other such that their respective deployable directions are opposite as shown in FIG. 15. In such a configuration, these extremity walls 108 are no longer necessary as they are located inside the volume formed by the two telescopic units facing each other.

Figure 17:
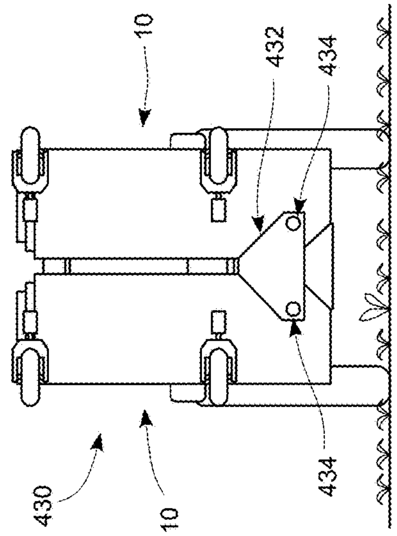
FIG. 17 shows a rear view of the spraying machine and the agricultural tractor of FIG. 16.
Figure 16:
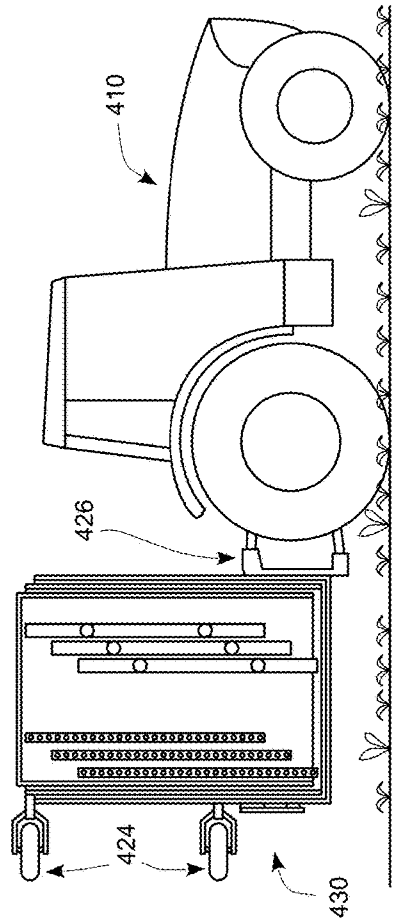
FIG. 16 shows a side view of spraying machine connected to an agricultural tractor according to another embodiment, whereby the spraying machine comprises two agricultural telescopic spraying units in the retracted configuration and in an upright position for transportation.
Figure 18:
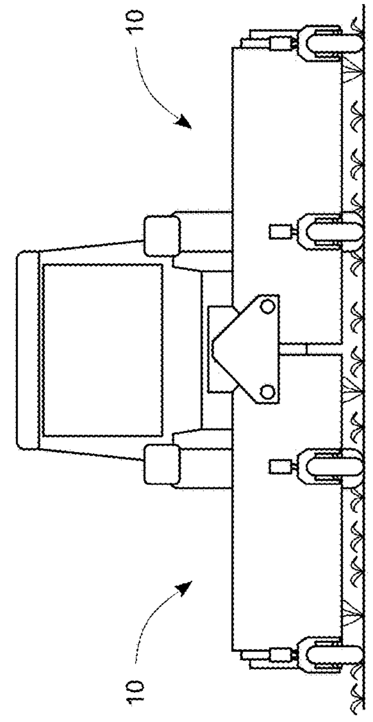
FIG. 18 shows a rear view of the spraying machine and the agricultural tractor of FIG. 16 with the spraying machine resting on the ground in a horizontal position and with the two agricultural telescopic spraying units in the retracted configuration.

With reference to FIGS. 16 to 19, another aspect of the invention relates to a spraying machine 430 rigidly attachable to an agricultural tractor 410 by a three-point hitch system 426 and that is kept raised above the ground during transport. The spraying machine 430 comprises two agricultural telescopic units 10, as described with reference to FIGS. 1 to 8, that are pivotably mounted on the supporting frame 432 to be raised in an upright position for transportation as shown in FIGS. 16 and 17.

Figure 19:
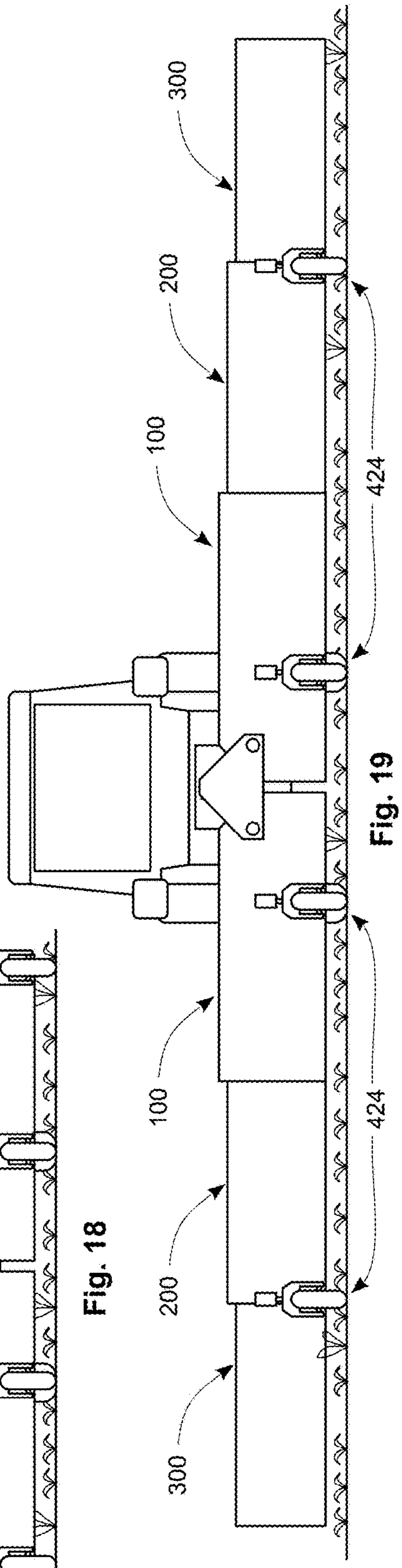
FIG. 19 shows a similar view of FIG. 18 with the two agricultural telescopic spraying units in the deployed configuration.

As for the spraying machine 420 illustrated by FIGS. 12 to 15, the two telescopic units 10 of the mounted spraying machine 430 are fixed to the supporting frame 422 such that their respective deployable directions are opposite as shown in FIG. 19. Each telescopic units 10 of the spraying machine 430 comprises one or more wheels 424 resting on the ground when the spraying machine is operating so as to support part of its weight.

With reference to FIGS. 20 to 23, a further aspect of the invention relates to a spraying machine 440 trailable by a tractor by a single hitch point and is never completed supported by the tractor.

Figure 21:
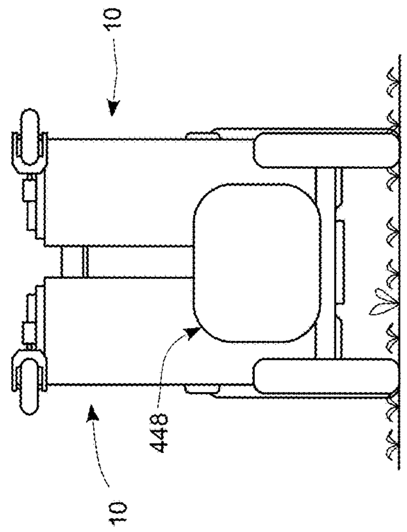
FIG. 21 shows a rear view of the trailed spraying machine and the agricultural tractor of FIG. 20.
Figure 20:
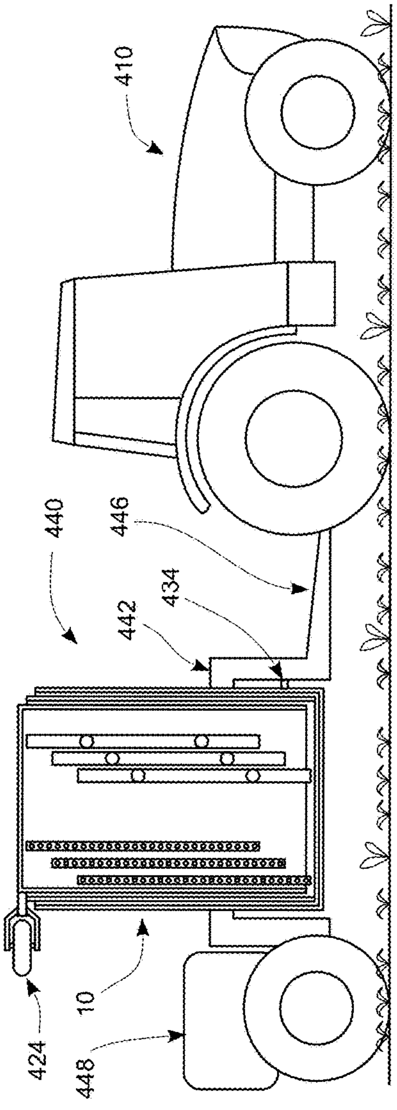
FIG. 20 shows a side view of spraying machine trailed by an agricultural tractor according to another embodiment, whereby the spraying machine comprises two agricultural telescopic spraying units in a retracted configuration and in an upright position for transportation.
Figure 22:
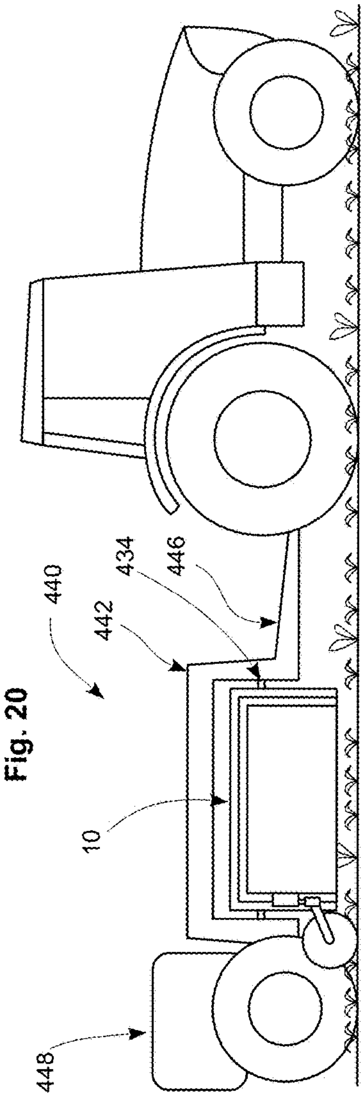
FIG. 22 shows a side view of the trailed spraying machine and the agricultural tractor of FIG. 20 with the spraying machine resting on the ground in a horizontal position.
Figure 23:
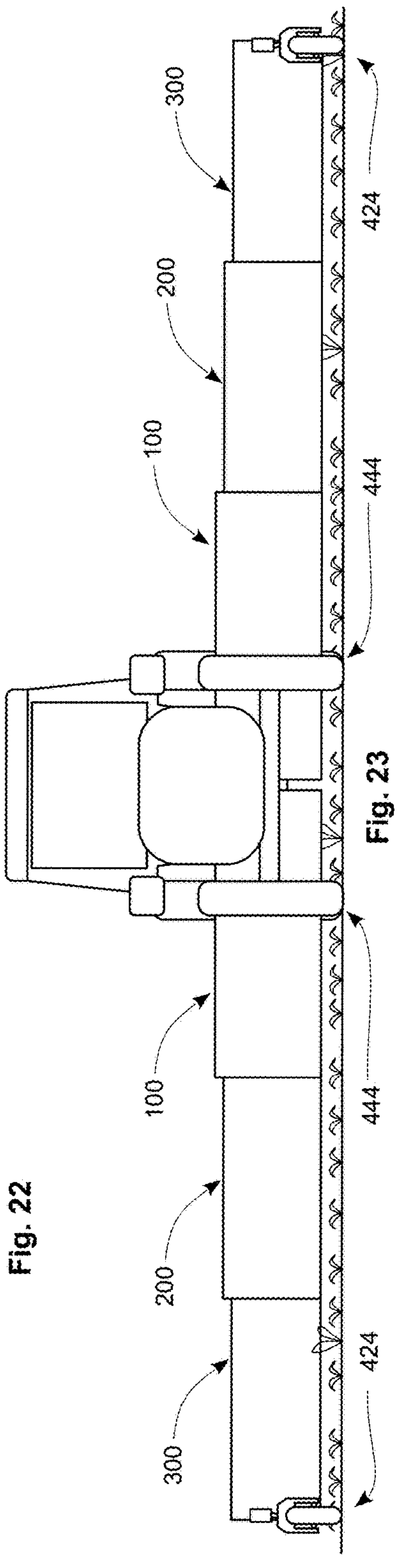
FIG. 23 shows a rear view of the trailed spraying machine and the agricultural tractor of FIG. 22 with the spraying machine resting on the ground in a horizontal position with the two agricultural telescopic spraying units in the deployed configuration.

To this end, the trailable spraying machine 440 comprises a supporting frame 442 attachable the tractor 410 by a drawbar 446 and a hitch joint (not shown), wheels 444 attached to a rear side of the supporting frame 442, a fluidic system with tank and pressure pump 448 mounted on the supporting frame 442 and two agricultural telescopic units 10, as described with reference to FIGS. 1 to 8. These two telescopic units 10 are mounted on the supporting frame such that their respective deployable directions are opposite as shown in FIG. 23. Each agricultural telescopic unit 10 is further pivotally mounted on the supporting frame 442 by means of a longitudinal rotation axis 434 to be pivoted in an upright position for transportation as shown in FIGS. 20 and 21. Each telescopic units 10 of the spraying machine 430 comprises one or more wheels 424 resting on the ground when the spraying machine is operating.

The wheel 424 as shown in the spraying machines 420, 430, 440 are attached to a rear side of the agriculture telescopic units 10 with respect to the travelling direction of the machine 420, 430, 440. The wheels 424 are in contact with the ground during operation so as to provide a constant distance between the agricultural telescopic units 10 and the cultivated field 400. The vertical position of the wheel 424, when in contact with the ground, is preferably adjustable either manually or through an automatic height control system so as to provide an adjustable distance between the agricultural telescopic units 10 and the cultivated field.

In another embodiment, the agricultural telescopic units 10 of the spraying machines 420, 430, 440 may comprise only a proximal and a distal case according to the embodiment illustrated by FIGS. 9 to 11. In yet another embodiment, the agricultural telescopic units 10 of the spraying machines 420, 430, 440 may comprise more than one intermediate nestable case between the proximal and distal case.

The agricultural telescopic units 10 of any of the above-spraying machines 420, 430, 440 may be controlled, when operating on the field, to be completely deployed or partially deployed between the retracted and deployed configurations to adapt the spraying machines to the width of the field to be treated.

The invention claimed is:

1. Agricultural telescopic unit for treating an area of a cultivated field, comprising a telescopic structure adapted to be actuated between a retracted configuration and a deployed configuration, the telescopic structure comprising at least a proximal case and a distal nestable case, wherein the distal nestable case is slidably connected to the proximal case by a guiding system to move into or outside the proximal case in a deployment direction when the telescopic structure is respectively moved in the retracted and deployed configuration, wherein the proximal case and the distal nestable case each comprises a top wall arranged to be in a plane parallel to the cultivated field when the agricultural telescopic unit is operating with the telescopic structure in the deployed configuration, and two opposite side walls, said distal nestable case further comprising an extremity wall extending between said two opposite side walls to form an enclosure delimiting an open side facing the cultivated field when the telescopic structure is in the deployed configuration, the agricultural telescopic unit further comprising a camera system mounted inside each of the proximal case and the distal nestable case and arranged to acquire images of the cultivated field through the open side and a plant treatment device mounted inside each of the proximal case and the distal nestable case.

2. Agricultural telescopic unit of claim 1, wherein the proximal case further comprises a first and a second equipment supports mounted inside said proximal case and extending along the deployment direction of the telescopic structure, each of said first and second equipment supports comprising a rail, and wherein the distal nestable case comprises a first and a second slider slidably engaged with respective rails of the first and second equipment supports of the proximal case.

3. Agricultural telescopic unit of claim 2, wherein the camera system and the plant treatment device of the proximal case are mounted respectively on the first and second equipment supports of said proximal case and wherein the camera system and the plant treatment device of the distal nestable case are mounted against a bottom side of the top wall of said distal nestable case.

4. Agricultural telescopic unit of claim 1, further comprising at least one intermediate nestable case between said proximal case and distal nestable case, wherein said at least one intermediate nestable case comprise each a top wall arranged to be in a plane substantially parallel to the cultivated field when the agricultural telescopic unit is operating with the telescopic structure in the deployed configuration, two opposite side walls, a first and a second equipment support extending along said deployment direction and additional camera system and plant treatment device mounted inside said intermediate nestable case.

5. Agricultural telescopic unit of claim 4, wherein the intermediate nestable case further comprises a first and a second intermediate support extending along said deployment direction, each of said first and second intermediate supports having a slider slidably engaged with respective rails of a first and a second equipment supports mounted inside said proximal case and extending along the deployment direction of the telescopic structure, wherein the distal nestable case comprises a first and a second slider slidably engaged with a rail of the first and second equipment support of the intermediate nestable case, and a third and a fourth slider slidably engaged with a rail of respective first and second intermediate supports of said intermediate nestable case.

6. Agricultural telescopic unit of claim 4, wherein the camera system and the plant treatment device of the intermediate nestable case are mounted respectively on the first and second equipment supports of said intermediate nestable case and wherein the camera system and the plant treatment device of the distal nestable case are mounted against a bottom side of the top wall of said distal nestable case.

7. Agricultural telescopic unit of claim 4, wherein an extremity of each of the first and second equipment supports of the intermediate case is fixed to the intermediate case top wall by an extremity fixture on the proximal case side.

8. Agricultural telescopic unit of claim 4, wherein an extremity of each of the first and second equipment supports of the intermediate case is fixed to the intermediate case top wall.

9. Agricultural telescopic unit of claim 4, further comprising a first and a second telescopic actuator comprising each an outer cylinder with an open end and a telescopic element coaxially mounted within the outer cylinder for sliding movement relative to the outer cylinder, the outer cylinder of first telescopic actuator having one extremity fixed to the proximal case, a distal extremity of the telescopic element of the first telescopic actuator being fixed to the outer cylinder of the second telescopic actuator, the outer cylinder of the second telescopic actuator being fixed to a top wall of the intermediate nestable case by an extremity fixture on a proximal case side, a distal extremity of the telescopic element of said second telescopic actuator being fixed to the extremity wall of the distal nestable case, so that said first and second telescopic actuators can actuate the telescopic structure between the retracted configuration and the deployed configuration, the first actuator being arranged to move the intermediate nestable case in relation to the proximal case, the second actuator being arranged to move the distal nestable case in relation to the intermediate nestable case.

10. Agricultural telescopic unit of claim 1, wherein the camera system of each of at least said proximal case, and distal nestable case are mounted in a same plane substantially parallel to the cultivated field when the agricultural telescopic unit is operating with the telescopic structure in the deployed configuration parallel to the cultivated field.

11. Agricultural telescopic unit of claim 1, wherein the plant treatment device of each of at least said proximal case and distal nestable case is a spray bar comprising a plurality of nozzles.

12. Agricultural telescopic unit of claim 11, wherein the plant treatment devices of the proximal case and distal nestable case, are mounted such that distal ends of respective plant treatment devices are located in a same plane substantially parallel to the cultivated field when the agricultural telescopic unit is operating with the telescopic structure in the deployed configuration parallel to the cultivated field.

13. Agricultural telescopic unit of claim 1, further comprising at least one actuator connected to both the proximal case and the distal nestable case to actuate the telescopic structure between the retracted configuration and the deployed configuration.

14. Spraying machine for an agricultural tractor, comprising a supporting frame attachable to the agriculture tractor by means of a three-point hitch system, and two agricultural telescopic units of claim 1 fixed to the supporting frame such that their respective deployable directions are opposite.

15. Spraying machine of claim 14, wherein each agricultural telescopic unit is pivotably mounted on said supporting frame to be moved in an upright position for transportation.

16. Spraying machine of claim 14, wherein at least one wheel is attached to a rear side of the agriculture telescopic units with respect to the travelling direction of the machine, said at least one wheel being in contact with the ground during operation so as to provide a constant distance between the agricultural telescopic units and the cultivated field.

17. Spraying machine of claim 16, wherein a vertical position of said at least one wheel, when in contact with the ground, is adjustable either manually or through an automatic height control system so as to provide an adjustable distance between the agricultural telescopic units and the cultivated field.

18. Spraying machine for an agricultural tractor, comprising a supporting frame attachable to the agricultural tractor by means of a drawbar, two wheels attached to a rear side of the supporting frame, a fluidic system with tank and pressure pump mounted on the supporting frame and two agricultural telescopic units of claim 1, wherein each agricultural telescopic unit is pivotally mounted on said supporting frame by means of a longitudinal rotation axis to be pivoted in an upright position for transportation.

* * * * *